United States Patent

[11] 3,590,201

| [72] | Inventor | Charles B. Basinger<br>Parma, Mich. |
|------|----------|-------------------------------------|
| [21] | Appl. No. | 824,469 |
| [22] | Filed | May 14, 1969 |
| [45] | Patented | June 29, 1971 |
| [73] | Assignee | Aeroquip Corporation<br>Jackson, Mich. |

[54] PHOTOELECTRIC CONTROL SYSTEMS FOR BRAZING TOOLS
4 Claims, 6 Drawing Figs.

[52] U.S. Cl. .................................................. 219/8.5, 215/227
[51] Int. Cl. ........................................................ H05b 5/00
[50] Field of Search............................................ 250/227, 215; 314/63; 719/110, 125, 8.5

[56] References Cited
UNITED STATES PATENTS

| 3,262,006 | 7/1966 | Sciaky et al. | 219/125 |
| 3,275,795 | 9/1966 | Bosna et al. | 219/125 |
| 3,440,389 | 4/1969 | Meter | 219/110 X |

*Primary Examiner*—Walter Stolwein
*Attorney*—Jerry K. Harness

ABSTRACT: A temperature-sensing system which is particularly adapted to be utilized in conjunction with a brazing operation wherein the temperature at the point of brazing is sensed and the brazing operation is controlled in response to the sensed temperature, the temperature being sensed by means of a fiberoptic or a solid light pipe. The light being transmitted through the fiberoptic pipe is then translated through a transducer in the form of a photoelectric device to change the light signal to an electrical signal. The intensity of the electrical signal is then sensed to control the termination of the brazing cycle.

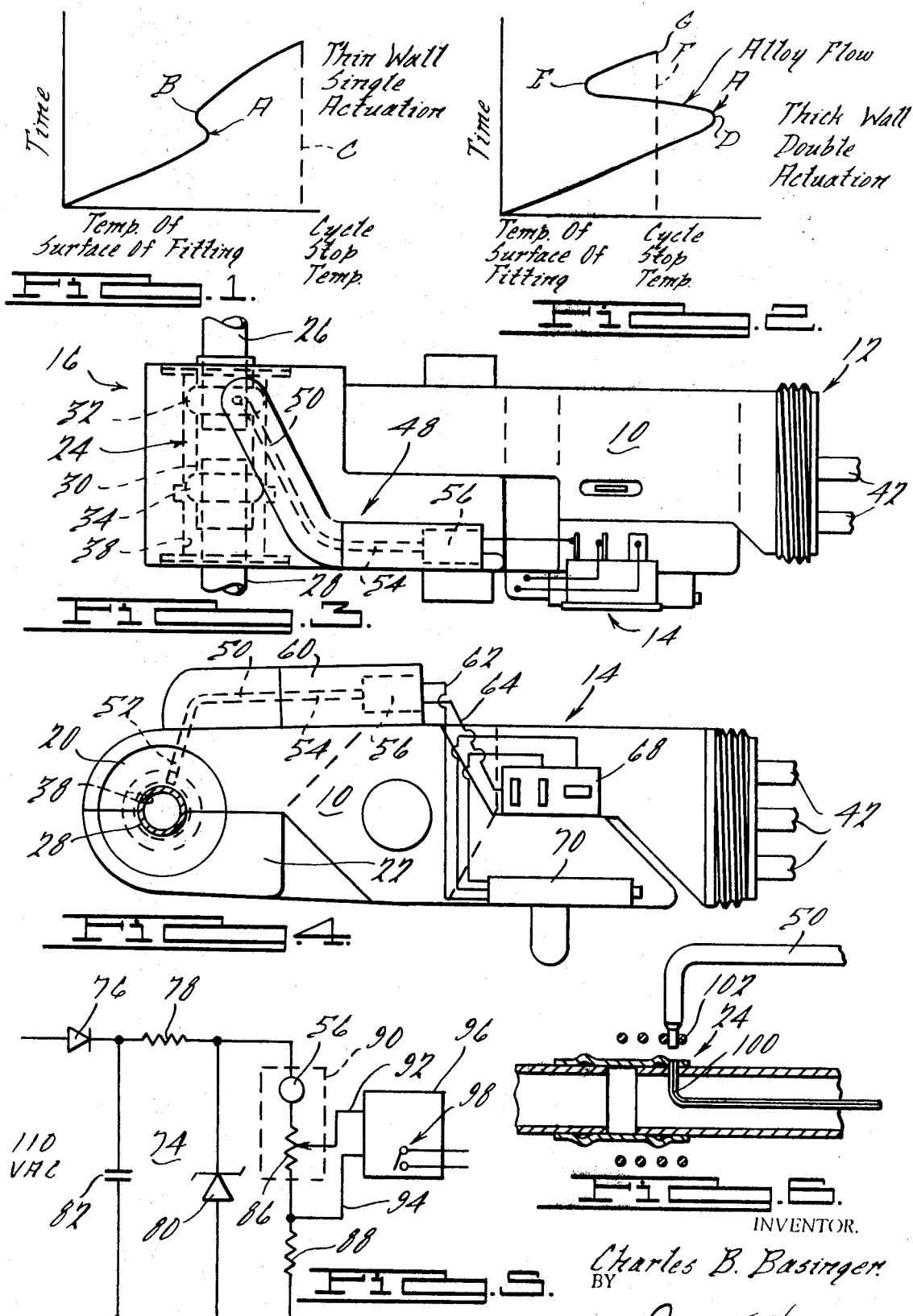

3,590,201

PHOTOELECTRIC CONTROL SYSTEMS FOR BRAZING TOOLS

BACKGROUND AND SUMMARY OF THE DEVELOPMENT

This invention relates generally to a temperature-sensing system and, more particularly, to an optical temperature-sensing apparatus and control circuit for controlling the parameters of a brazing operation in response to the temperature achieved at the point of brazing.

In certain brazing systems now being used, it is the practice to control the final braze by varying the duration of or the time of application of the heat to the work and/or to vary the amount of current being supplied in accordance with certain characteristics of the work, as for example, size, shape, density, etc. With this system, it is necessary to attempt to predict the brazing time and current which would be required to achieve a proper braze for any selected piece of work, and there is no direct control of the temperature at the braze point. Further, it is necessary to closely examine the resulting braze to insure that proper bond was formed between the elements being connected. In certain sophisticated areas where it is necessary to have a braze which is highly reliable, it is necessary to examine the braze through an X-ray process.

With the system of the present invention, the temperature at the actual braze point is sensed and utilized to control the duration of the brazing cycle in response to the sensed temperature at the braze point. It has been discovered that a proper or quality braze occurs when the metals reach a preselected temperature after the brazing material has begun to flow. Also, it is known that the temperature at the braze point, or adjacent thereto, rises to a certain level and then drops off at the point at which the metal begins to flow, the drop off being due to the dissipation of the heat energy into the flowed metal. The temperature then again rises to the proper braze level, this latter level being capable of prediction for a given metal workpiece.

Accordingly, if the operator is able to sense the temperature at the braze, the braze may be terminated at the point when the work reaches the preselected braze temperature. The system of the present invention, in its preferred embodiment, includes a light pipe having one end positioned adjacent the brazing point and the other end being positioned adjacent the photocell to convey the light from the heated piece being brazed to the photocell. The photocell then translates the light being transmitted by the light pipe to an electrical signal, the magnitude of which varies as direct function of the variation in braze temperature. This signal is utilized to terminate the braze when the temperature reaches the predetermined proper level.

While the invention is being described particularly in connection with a brazing operation, it is to be understood that it is contemplated that the invention be applicable to heat-treating operations generally, or other operations where the temperature of an article or material is raised to a preselected level, it being desired to vary the operation in response to temperature. Further, the system of the present invention may be utilized to provide a monitoring signal of the heat-treating or brazing operation being performed wherein a continuous output or display is provided to indicate the present and past temperature of the work being observed.

Accordingly, it is one object of the present invention to provide an improved system for sensing temperatures of a particular environment.

It is another object of the present invention to provide an improved system for monitoring the temperature of a heat-treating operation.

It is still another object of the present invention to provide an improved system for controlling the termination point of a brazing cycle.

It is still another object of the present invention to provide an improved system for continuously monitoring the temperature of a heat-treating operation.

It is still a further object of the present invention to provide an improved system for continuously monitoring a brazing operation to determine the characteristic temperatures of the brazing operation and controlling the operation in response to sensed temperature.

It is still another object of the present invention to provide an improved temperature-responsive system for controlling a heat-treating operation wherein the light emitted from the point of heat treatment is utilized to control the heat-treating operation.

It is still a further object of the present invention to provide an improved temperature-responsive control system for use in a brazing cycle, the system being inexpensive to manufacture, simple in operation and reliable in its use.

It is still a further object of the present invention to provide an improved temperature-sensing system for use in a brazing operation which utilizes a light characteristic of the temperature, this characteristic being translated into an electric control signal.

Further objects, features and advantages of this invention will become apparent from a consideration of the following description, the appended claims and the accompanying drawings in which:

FIG. 1 is a temperature vs. time graph illustrating a typical characteristic curve for the brazing of a thin tube workpiece;

FIG. 2 is a second temperature vs. time graph of a typical brazing operation wherein a thick-walled workpiece is utilized;

FIG. 3 is a top view of a brazing head incorporating certain features of the present invention and particularly illustrating the positioning of the light pipe relative to the workpiece;

FIG. 4 is a side view of the brazing head of FIG. 3;

FIG. 5 is a schematic diagram of a preferred electrical circuit which is adapted to be utilized in conjunction with the system of the present invention; and FIG. 6 is a sectional view schematically illustrating the positioning of the light pipe relative to a braze point and also illustrating a thermocouple element for calibrating the system of the present invention.

Referring now to FIG. 1, there is illustrated what has been found to be a typical temperature vs. time graph of a brazing operation involving thin-walled workpieces to be brazed. The curve depicts the temperature characteristic wherein, at point A, the temperature rises to a knee which corresponds with the point of alloy melt. This point varies with each material selected and is the temperature at which the material will initially start to flow. The temperature of the sample being observed tends to drop off due to the dispersion of the heat into the surrounding metal after the braze begins to flow. The temperature reaches a valley; point B, at which point the temperature again rises to a preselected final braze temperature, line C at which temperature the cycle is terminated. The particular cycle termination temperature is selected to correspond to a point at which an optimum braze is accomplished.

FIG. 2 is an illustration of a typical brazing temperature vs. time curve wherein the workpieces being utilized or brazed together are of thick-wall construction. It is to be noted that the temperature begins to rise with the application of heat until such time as peak D is reached, which peak corresponds to the point of alloy melt. The temperature then drops off to a valley point E, during which period the alloy is flowing with the continued application of heat. The flow of the alloy reduces the monitored temperature at the point being sensed because of the dispersion of heat as described above. However, at the valley point E, the temperature again rises to achieve the cycle stop temperature F, which is preselected for the particular alloy and workpieces being utilized.

In the particular cycle illustrated in FIG. 2, it is to be noted that the point of alloy melt temperature, point D, exceeds the cycle stop temperature and must be separately detected and discriminated in order to insure that the cycle is not terminated at the point of alloy melt temperature rather than ultimate braze termination temperature point G. Accordingly, the system of the present invention contemplates separately detecting the point D and stopping the braze cycle at the time that the point G temperature is sensed.

Referring now to FIGS. 3 to 6, there is illustrated a preferred form of the apparatus for practicing the features of the present invention, a circuit which is utilized to derive the control signal and a system for calibrating the assembly. Referring particularly to FIGS. 3 and 4, there is illustrated a brazing fixture 10 which includes a coupling section 12, a connector section 14 and a head and sensing section 16. The head portion 16 of the brazing tool includes a pair of relatively movable jaws 20, 22 which are adapted to be opened to receive the work and closed to position the heat coils closely adjacent the work 24 being brazed. In the illustrated example, the work includes a first and second section 26, 28, the in-line facing ends of which are enclosed by means of a sleeve member 30. The sleeve member 30 includes a pair of bead sections 32, 34 which are adapted to receive the braze material on an interior portion of the cavity.

The movable jaws, and particularly the interior portion of each jaw, form an aperture 38 which surrounds the work and a heating coil (not shown) is adapted to be mounted coaxially with the cylindrical aperture 38. Electrical energy is supplied to the heating coil from a source of energy (not shown) connected to a plurality of conductors 42 entering from the coupling section 12, the energy being supplied and controlled from an external control panel (not shown). As heat is applied to the coil, the workpiece 24 begins to heat up generally in accordance with one of the curves described in conjunction with FIGS. 1 and 2, depending on the thickness of the stock being utilized in the workpiece 24. As the workpiece heats to a particular temperature, light is emitted from the heated workpiece, the intensity and color of the light being a function of the temperature achieved by the workpiece.

This temperature is sensed by means of a light tube assembly 48 which includes a fiberoptic or light tube 50 having one end 52 positioned closely adjacent the workpiece 24 and the other end 54 terminating adjacent a transducer 56. The pipe 50, selected for use in conjunction with a preferred embodiment of the present invention, is sold under the trade name "Image Conduit" and is generally formed as a rod having a hexagonal cross section, the flats of the hexagon being approximately ⅛ of an inch in length. The material of the light pipe is generally not flexible but is adapted to be bent to any desired shape by heating the light pipe and carefully bending the pipe after it has become softened. It has been found that the end exposed to the hot metal being brazed is relatively unchanged after many cycles of operation for the particular pipe described.

The transducer 56 generally consists of a cadmium sulfide photoelectric cell which is mounted directly on the brazing tool, it being understood that other types of cells may also be used. The piece of light pipe 50 which is utilized to convey light from the heated workpiece to the photo cell is covered by a shield 60 which generally surrounds the central portion of the light pipe 50 and the transducer 56.

The photo cell particularly may be of the RCA type SQ 2528 which is approximately ¼ inch in diameter at the sensing face. The cell has a resistance of approximately $10^7$ ohms without being illuminated from the light source 50 and this resistance drops to approximately $10^5$ ohms when exposed to the illumination of the braze piece at brazing temperatures. The leads 62, 64 from the transducer 56 are directed to either a connector member 68 or a control member 70. The control member 70 generally includes a potentiometer which is supplied with electrical energy from an external source, the potentiometer being connected in series circuit with the transducer 56, as will be more fully explained in conjunction with the description of FIG. 6. The leads from the potentiometer and the transducer are connected to member 68, which in turn is adapted to be supplied with electrical energy and a control conductor through an external male plug element (not shown).

Referring now to FIG. 5, there is illustrated a preferred circuit 74 for deriving the output signal to control the termination of the brazing cycle. The circuit 74 is supplied with an AC voltage of approximately 110 v., this voltage being supplied to a half-wave rectifying, filtering and voltage regulating circuit which includes a diode 76, resistor 78, capacitor 82 and zener diode 80. The diode 76 half-wave rectifies the AC voltage and the resistor 78 and capacitor 82 form a filter circuit to smooth the incoming pulsating DC. The zener diode 80 regulates the voltage being fed to the output circuit, which includes the transducer 56, a potentiometer 86 and a current limiting resistor 88. The potentiometer 86 is included in the control circuit 70 described in conjunction with FIGS. 3 and 4. The portion illustrated within the dotted box 90 is mounted on the head 10 while the remaining portion of the circuit is mounted externally of the brazing tool 10.

From the foregoing circuit it is seen that current flowing through the potentiometer 86 is controlled by means of the impedance of the transducer 56, the higher the illumination on the transducer 56 the lower the impedance thereof and the higher the current flowing through the potentiometer 96. Thus, the voltage across the potentiometer 86 will rise to provide an increasing output voltage on slider conductor 92 relative to fixed conductor 94. This signal is fed to a recording device 96 which includes a pair of contacts 98 to control the energization and deenergization of the brazing heater coil. The control circuit 96 may also include a system for rejecting the initial pulse described in conjunction with FIG. 2 so that the brazing cycle is not terminated at the metal flow point. This circuit may take any form which is known in the art to provide an output pulse with every second pulse per braze cycle from the control circuit which reaches the selected peak level.

Referring now to FIG. 6, there is illustrated a system for calibrating the control system of the present invention. Particularly, a thermocouple element 100 is positioned directly beneath the light pipe 50 such that the workpiece 24, when heated by a coil 102, will raise the workpiece to the desired temperature, this temperature being sensed by the thermocouple element 100. This temperature is visually "read" by means of the light pipe 50 and the light signal is fed to the transducer 56. In this way the temperature sensed by the thermocouple assembly 100 is correlated with the temperature sensed by the light pipe and transducer combination.

While it will be apparent that the preferred embodiment of the invention disclosed is well calculated to fulfill the objects above state, it will be appreciated that the invention is susceptible to modification, variation and change without departing from the proper scope or fair meaning of the subjoined claims.

What I claim is:

1. In combination, a brazing tool for applying heat to telescoped ends of tubing to effect a brazed connection therebetween, said tool comprising first and second sections movable relative to each other from open to closed positions and adapted in said closed position to surround the ends of the tubes to be brazed, heating means carried within the adjacent ends of said sections wherein a brazing chamber is formed by said ends in said closed position, there being a passage in said end of said first section extending from said chamber outwardly of said end, power means connected to said tool and operable to energize said heating means, cycle control means carried by said first section and having a sensing end extending through said passage into said chamber, and means interconnecting said control means and said power means operable to shut off said power means in response to a predetermined condition of said sensing end.

2. The subject matter of claim 1 wherein said control means senses light changes in said chamber during brazing in response to changes in temperatures.

3. The subject matter of claim 1 wherein said control means includes a light pipe and transducer means positioned adjacent thereto, said light pipe transmitting light signals from said chamber to said transducer means and said transducer means changing said light signals to electrical signals.
4. The subject matter of claim 3 wherein said first section is provided with an enclosure surrounding and encasing said control means.